Figure 1:
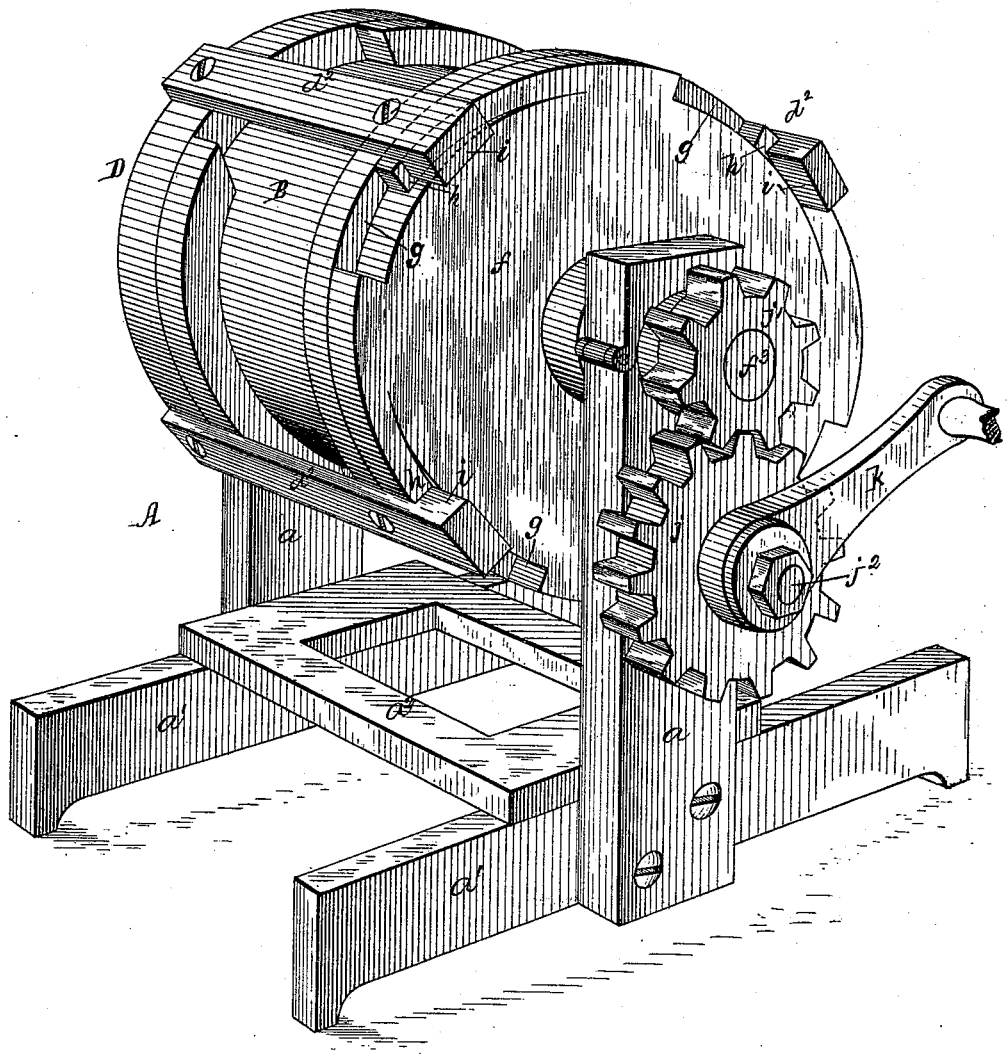

(No Model.)  2 Sheets—Sheet 1.

H. C. ALEXANDER.
CHURN.

No. 491,917. Patented Feb. 14, 1893.

(No Model.)
2 Sheets—Sheet 2.
H. C. ALEXANDER.
CHURN.
No. 491,917.
Patented Feb. 14, 1893.
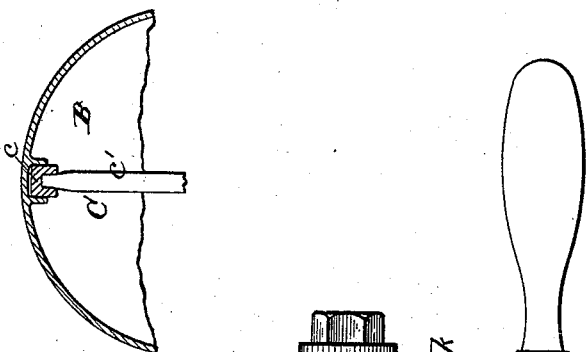
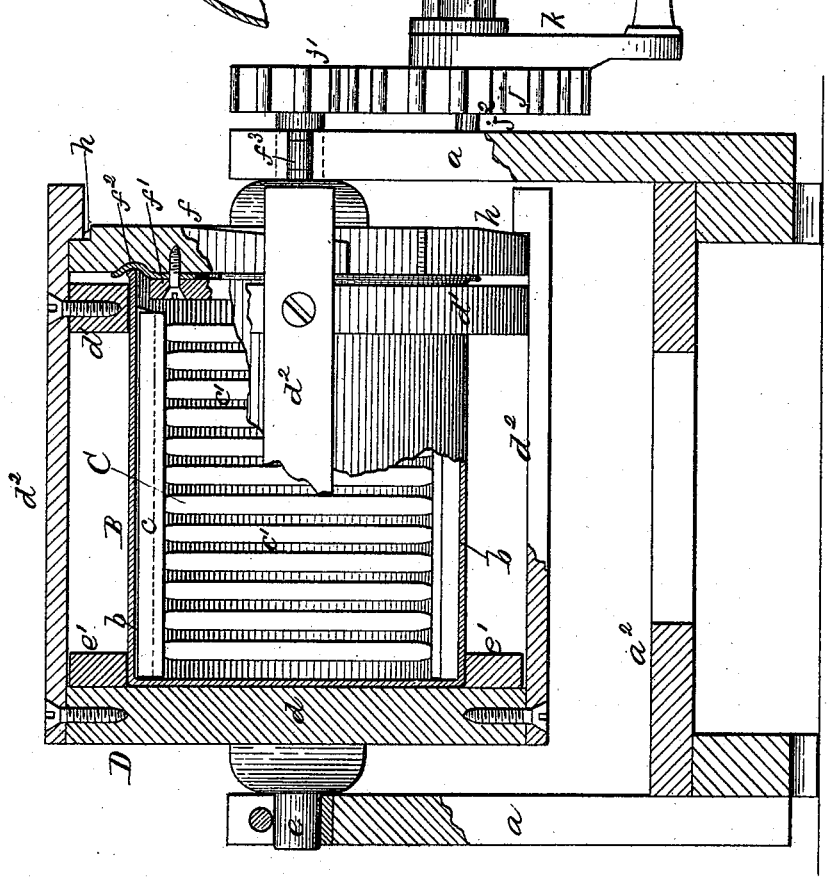
Attest:
Geo. T. Smallwood,
E. J. Gresham
Inventor:
Horace C. Alexander,
By Paine & Son,
attys.

UNITED STATES PATENT OFFICE.

HORACE C. ALEXANDER, OF BONHAM, TEXAS.

CHURN.

SPECIFICATION forming part of Letters Patent No. 491,917, dated February 14, 1893.

Application filed January 16, 1892. Serial No. 418,292. (No model.)

*To all whom it may concern:*

Be it known that I, HORACE C. ALEXANDER, a citizen of the United States, residing at Bonham, in the county of Fannin and State of Texas, have invented certain new and useful Improvements in Churns; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improved churn, characteristic for its simplicity, facility of operation and expedition in the churning or conversion of the cream into butter, and which is adapted to permit of the simultaneous securing and retention of the cream vessel or receptacle in position in its journaling or carrying frame, as well as the cover upon said vessel, and to provide for the ready removal of said vessel or receptacle and its said cover preparatory to removing the contents of the vessel or the cleaning thereof; and to these ends my invention consists of the novel combination and construction of parts substantially as hereinafter fully disclosed and pointed out in the claim.

In the accompanying drawings: Figure 1 is a plan view of my improved churn. Fig. 2 is a front elevation, Fig. 3 a longitudinal section thereof.

In the embodiment of my invention, I provide a suitable supporting frame A comprising end-uprights $a\ a$, secured at their lower ends to transverse base pieces $a'$ connected together by a central longitudinal piece $a^2$ secured to said base pieces at their centers.

B is the cream vessel or receptacle which is preferably cylindrical, and fitted in this vessel or receptacle is a stationary dasher or breaker C, its rectangular longitudinal side bars, $c$, being held in corresponding retaining grooves or guides $b$, of said vessel or receptacle, which, while adapted to permit the ready withdrawal of the dasher when necessary, as in cleaning the vessel or receptacle or removing its contents, hold the dasher against independent movement as the vessel or receptacle is rotated, the dasher thus being held relatively stationary. The dasher has a series of cross bars $c'$ connecting, or integral, with its side bars $c$ and extending throughout its length and width, arranged at short intervals apart to properly act upon the cream and break up the globules thereof.

D is a frame for carrying or journaling in position the cream vessel or receptacle B with its longitudinal axis in a horizontal plane, consisting of an end disk, or other suitable form of support, $d$ and an opposite end ring or other open support $d'$, connected together by a series of peripheral bars or pieces $d^2\ d^2$, secured to said supports at their rear ends and near their forward projecting ends, respectively. The disk or support $d$, has on one side a central journal, $e$, supported in a socket or bearing in the upper end of one of the end-uprights $a$ of the supporting frame A, and, upon its opposite side it has cleats or projections, $e'\ e'$, to prevent the displacement thereat of the abutting or bottom end of the cream vessel or receptacle B, when in position in the frame D.

The cover E of the cream vessel or receptacle B consists of a disk or plate $f$ having on one side a central boss or raised portion $f'$ adapted to fit snugly within, and close the open end of said vessel or receptacle, the same being rendered liquid tight at this point by a rubber or elastic packing or gasket $f^2$ secured to said disk, around said boss or raised portion and adapted to engage the edge of said vessel. The plate or disk $f$ has upon its outer side a central journal $f^3$ supported in and projecting through a socket or bearing in the upper end of the front upright $a$ of the supporting frame A, and in the periphery of said disk or plate is a series of slots or recesses $g$ corresponding to the number, and adapted to permit the passage therethrough of the forward projecting ends of the peripheral bars or pieces $d^2$. The plate or disk $f$ is also provided, upon its outer side, near the periphery with cam surfaces or inclines $h$, the inner edge of each of which starts at one of the side edges of each of the recesses or slots $g$, and following the curvature of said disk vanishes along the surface of the disk.

The forward projecting ends of the peripheral bars or pieces $d^2$ are provided with inwardly facing inclined or cam faced projections *i, i*, adapted to engage the cam surfaces or inclines *h* of the disk *f*, after the insertion of said projecting ends of said bars into the slots *g* and the turning of the disk in the requisite direction, thus providing for the simultaneous securing and retention in positions of the cream vessel or receptacle in its carrying frame and the cover upon said vessel or receptacle.

Among other ways as is obvious for revolving the cream vessel carrying frame D, I provide intermeshing gear or cog wheels *j, j'*, one secured upon the shaft or journal $f^3$ and the other borne by a journal $j^2$ secured to the front end-upright *a* of the frame A, said wheel *j'* having secured to or cast with it at one side, a handle or crank *k* for its convenient operation.

It is apparent that by my churn, which is simple and easily constructed, the operation of churning is effected with facility and expedition, while the contents of the cream vessel or receptacle can be quickly removed and the vessel be readily cleaned.

Having thus fully described my invention, what I claim as new and desire to secure by Letters Patent is:—

The churn consisting of the axially arranged cream vessel or receptacle and its dasher, the frame comprising an end disk or support, having a journal suitably supported upon a base-frame, and longitudinal peripheral bars secured at their rear ends to said end disk and having at their opposite ends inward facing cam-faced projections, the cover comprising a disk or plate provided with a central raised portion or base entering the open end of the cream receptacle, and with cam-surfaces or inclines and slots at the inner edges of said inclines, said cover or disk also having a journal suitably supported in position, substantially as set forth.

In testimony whereof I affix my signature in presence of two witnesses.

HORACE C. ALEXANDER.

Witnesses:
C. A. GRAY,
C. A. WHEELER.